(No Model.)
E. SOLVAY.
PROCESS OF MAKING BLEACHING POWDER.
No. 417,287. Patented Dec. 17, 1889.
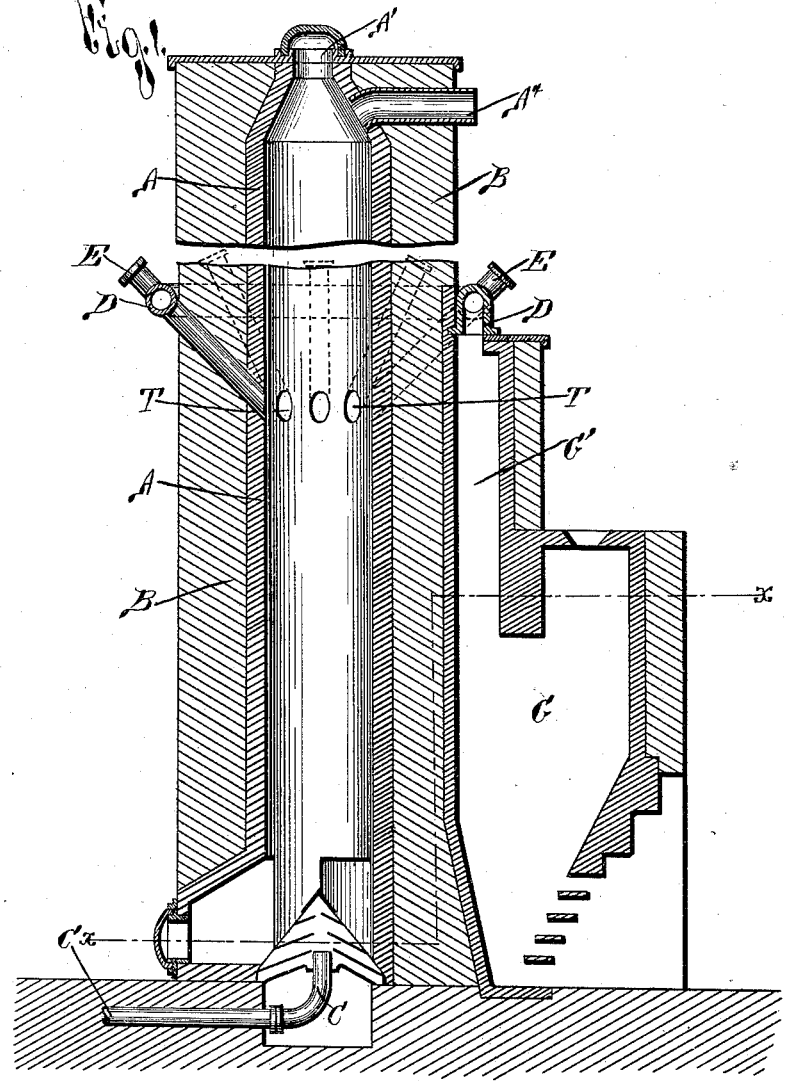
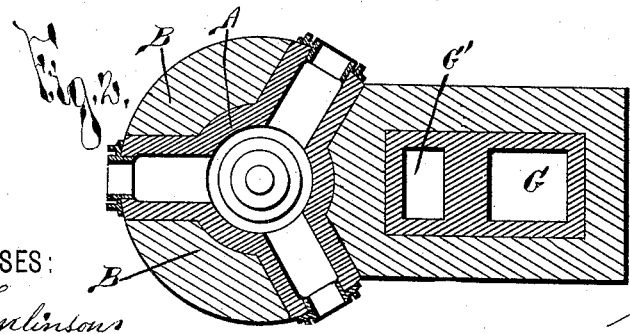
WITNESSES:
C. E. Tomlinson
H. C. Parsons
INVENTOR
Ernest Solvay
BY
George H. Hey
ATTORNEY

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

PROCESS OF MAKING BLEACHING-POWDER.

SPECIFICATION forming part of Letters Patent No. 417,287, dated December 17, 1889.

Application filed February 14, 1889. Serial No. 299,919. (No specimens.) Patented in Belgium January 5, 1888, No. 82,050.

*To all whom it may concern:*

Be it known that I, ERNEST SOLVAY, of Brussels, Belgium, have invented new and useful Improvements in the Process of Manufacturing Chloride of Lime, of which the following, taken in connection with the accompanying drawings, is a full, clear, and exact description.

My invention relates to improvements in the art of manufacturing chloride of lime or bleaching-powder, (for which I have obtained Letters Patent in Belgium, No. 82,050, January 5, 1888;) and it has for its object a simple and effective manner of producing chloride of lime at a minimum cost of expense; and to this end it consists, essentially, in decomposing in a desirable furnace a suitable chloride mixed with a clay-like or other suitable mixture, which will combine with the chloride and disengage the chlorine in passing the gases over or through a dilute solution of chloride of lime in water, causing the chlorine to combine with the calcium, and thus raise the strength of the solution of chloride of lime and separate the chlorine from the other gases passed over said solution, and then in subjecting this solution to hydrochloric acid and evolving a rich chlorine gas, which may be passed over the lime in the ordinary manner.

In describing my invention reference is had to the accompanying drawings, forming a part of this specification, in which like letters indicate corresponding parts in all the views.

Figure 1 is a vertical section of the tower used for decomposing the calcium chloride mixed with the clay; and Fig. 2 is a horizontal section of said furnace, taken on line *x x*, Fig. 1.

As described in my process patent for producing chlorine of even date herewith, I have discovered that mixtures of calcium chloride and a silicious clay-like substance give better results than a purely silicious base when decomposed for the purpose of producing chlorine gas. I have also observed that it is impossible to dry such a mixture up to the point of causing it to lose all its water without disengaging hydrochloric acid. As there is certainly an advantage in reducing the quantity of hydrochloric acid formed at the same time with the chlorine, I calcine the silicious clay first separately, so as to drive off the contained water and to obtain a decomposing material, which has at the same time the advantages of silicious and of clay-like materials.

It is not necessary to illustrate the furnace preferably used for the calcination of the clay, since there are various constructions of furnace, almost any of which would be suitable. The silicious clay is placed in the calcining-furnace in any suitable form, preferably small bricks, and after calcination is reduced to powder and mixed with the calcium chloride.

In the previous manufacture of chlorine it has been customary to so form the furnace for decomposing the material containing the chlorine as to exclude from the field of reaction the combustible or carbonated gases, as chlorine has a strong affinity for carbonic oxide, forming therewith oxychloride of carbon or carbonyl chloride, from which the chlorine cannot be recovered in its active state. Accordingly, it has been customary to decompose the chlorine-containing mixture by means of furnaces heated from the outside, thus preventing the entrance of carbonic oxide and the consequent forming of oxychloride of carbon. As this process of evolving chlorine by heating from the outside necessitates the use of a great amount of fuel and greatly adds to the cost of production, I have devised the furnace or apparatus illustrated in the drawings, and described and claimed in my apparatus application of even date herewith. In this furnace I introduce the carbonic oxide directly into the decomposing-chamber; but by the peculiar arrangement of the parts of the same I prevent the forming of oxychloride of carbon gas.

A represents the decomposing-furnace consisting of a high tower having a thick envelope of non-conducting material B, preventing radiation therefrom. In the upper part of the furnace A is an opening A', having a removable cover or cap, and into this opening a mixture of calcium chloride and calcined silicious clay is inserted until the tower is filled. In the lower part of the furnace I provide the pipe or conveyer C, discharging thereinto and forcing a current of air into the lower part of the furnace, from whence it constantly ascends.

The furnace is provided with tuyeres or apertures T, interposed between the opposite extremities of the furnace, about midway the height thereof, and through these tuyeres the crown of pipes E, preferably arranged in a circle, discharge the carbonic oxide or other fuel. The pipes E are connected by a suitable main or connecting pipe D to the discharge G' of the furnace G.

Coal or other fuel is placed in the furnace G, and the fire is so regulated that an abundance of carbonic oxide is produced and conducted from the flue or discharge G' of the furnace G to the main D, whence it is inserted into the midst of the material in the furnace A by means of the pipes E. The air inserted from the bottom of the furnace A brings about the combustion of the carbonic oxide, and is supplied in sufficient quantities to combine with the calcium chloride mixed with the silicious clay-like substance, and to produce the reaction $3CaCl_2 + Al_2(SiO_3)_3 + 3O = Al_2O_3 + 3CaSiO_3 + 3Cl_2$. The combustion soon heats to a white heat the material on a level with the tuyeres forming the combustion-zone of the furnace. This zone extends only a short distance, and immediately above the same is the decomposing-zone, in which the material is heated to a red heat and is thoroughly decomposed before its contact with the carbonic oxide in the combustion-zone, thus preventing the formation of oxychloride of carbon. The heat is sufficiently intense from the peculiar arrangement of the tuyeres and the prevention of radiation, as to thoroughly decompose the material before its entrance to said combustion-zone. Moreover the free carbonic oxide unites with an atom of oxygen of the inserted air forming carbonic anhydride, which has no affinity for the chloride, and is discharged therewith at the same time with the chloride gas. Before their exit through the discharge $A^4$ of the furnace these gases are cooled by passing through the great weight of material interposed between the decomposing-zone and the said discharge, thus preventing a great loss of heat which would otherwise accrue.

In the manufacture of chloride of lime it is customary to pass the gases directly over the lime, whereupon the chlorine combines therewith, forming chloride of lime or bleaching-powder. It would, however, be impracticable to pass the gases evolved from this furnace directly over the lime, as the carbonic anhydride has a great affinity for calcium and would combine therewith, preventing the manufacture of a salable chloride of lime, and forming a mixture of chloride of lime and calcium carbonate.

I have found that the manufacture of liquid chloride of lime is not injured in the least by carbonic anhydride. While all the chloride is absorbed, a portion of carbonic anhydride escapes absorption, and the rest forms calcium carbonate, which does no harm, because it is precipitated in an insoluble state. Accordingly, I pass the carbonic anhydride and chlorine over a solution of chloride of lime, whereupon all the chlorine gas is absorbed, combining with the dilute chloride of lime and raising the strength of said solution, while a portion of the carbonic anhydride escapes absorption and is conducted away by any suitable conveying-passage, and the remainder forms calcium carbonate, which may be separated by allowing the same to be precipitated and then drawing off the liquid chloride of lime. For this purpose any suitable form of vat or tank may be used, which is inclosed and has an inlet for the gases and an outlet for the carbonic anhydride, and also a means for drawing off the chloride of lime after the precipitation of the calcium carbonate. As, on the other hand, I cannot hinder the formation of a certain quantity of hydrochloric acid, in my principal reaction I condense the same and utilize it to attack the liquid chloride of lime produced, and thus obtain concentrated chlorine gas, which I pass over the lime in the ordinary way, or into the imperfect chloride of lime obtained with the weak chlorine, which accordingly rises to the strength desired.

It will be understood that while I prefer to obtain the hydrochloric acid in the manner described, yet I do not limit my process to the manner in which the said acid is obtained, since it may be produced independently of the chlorine and then be afterward mixed with the liquid chloride of lime. I can also apply my chlorine, which is dilute and adulterated with carbonic anhydride, to the manufacture of chlorates, and I do not limit the process to the use of calcium chloride, since magnesium chloride and other chlorides might be used without departing from the spirit of my invention.

Having thus fully described my invention, what I claim as new, and desire to secure by Letters Patent, is—

The process of making bleaching-powder, which consists in passing a mixture of chlorine and carbon dioxide through a dilute solution of chloride of lime with the separation of the carbonic acid, then the decomposition of the liquid chloride of lime by the chlorhydric acid produced, and finally the formation of solid chloride of lime by means of the rich chlorine gas obtained, substantially as described.

In testimony whereof I have hereunto signed my name, in the presence of two attesting witnesses, at the city of Brussels, Belgium, this 15th day of September, 1888.

ERNEST SOLVAY.

Witnesses:
G. F. CORRY,
J. A. FÜRSTENHOFF.